US006746745B2

(12) United States Patent
Nien

(10) Patent No.: US 6,746,745 B2
(45) Date of Patent: Jun. 8, 2004

(54) COMPOSITE BAMBOO BLINDS SLATS AND METHOD FOR MAKING SAME

(75) Inventor: Ming Nien, Taichung (TW)

(73) Assignee: Nien Made Enterprise Co., Ltd., Taichung (TW)

( * ) Notice: Subject to any disclaimer, the term of this patent is extended or adjusted under 35 U.S.C. 154(b) by 0 days.

(21) Appl. No.: 10/133,229

(22) Filed: Apr. 26, 2002

(65) Prior Publication Data

US 2003/0201030 A1 Oct. 30, 2003

(51) Int. Cl.7 ............................ B32B 5/12; B27D 1/00; B27L 9/00

(52) U.S. Cl. ........................ 428/58; 52/782.1; 144/346; 144/350; 144/352; 144/380; 144/3.1; 144/367; 156/62.6; 156/304.2; 428/106

(58) Field of Search ........................... 52/782.1; 156/60, 156/62.6, 250, 254, 304.1, 304.2; 144/346, 350, 352, 355, 380, 3.1, 367; 428/106, 107, 57, 58, 528

(56) References Cited

U.S. PATENT DOCUMENTS 5,143,792 A * 9/1992 Cramer et al. .......... 144/350 X
5,441,787 A * 8/1995 Fujii et al. .............. 428/106 X
5,786,063 A * 7/1998 Shibusawa et al. ..... 428/107 X
5,896,903 A 4/1999 Chen et al.
5,976,644 A * 11/1999 Sanaee et al. ................ 428/17
6,098,680 A 8/2000 Nien
6,192,949 B1 2/2001 Nien
6,321,803 B1 * 11/2001 Nien .......................... 144/350

FOREIGN PATENT DOCUMENTS

GB 2234935 * 2/1991 ................. 428/107

* cited by examiner

*Primary Examiner*—W. Donald Bray
(74) *Attorney, Agent, or Firm*—Stephen R. Seccombe; Sheldon & Mak

(57) ABSTRACT

A blinds slat has a major portion being strips of bamboo and a minor portion being one or more pairs of wooden strips that are located at or near opposite side extremities of the slat. The resulting composite bamboo and wooden slat as exemplary resistance to warping and other deleterious effects of exposure to sun and moisture. Also disclosed is a method for producing the slats that is particularly advantageous in avoiding environmental harm, in that only small amounts of wood are used.

16 Claims, 2 Drawing Sheets

COMPOSITE BAMBOO BLINDS SLATS AND METHOD FOR MAKING SAME

BACKGROUND

The present invention relates to window shades, and more particularly to such shades having bamboo slats, the slats themselves, and methods for making the slats.

Slats of conventional Venetian blinds are typically made of thin metal or plastic strips, the use of either of these types of material presents significant environmental risks, in the form of pollution, depletion of non-renewable resources, damage to surface features, and various combinations thereof. Wood has also been used for making the slats of blinds, but this material is increasingly scarce and expensive, particularly when selected and processed for uniformity, dimensional stability, and appearance.

As a result of these and other considerations, bamboo has also been used to fabricate slats. The use of bamboo for the slats of blinds provides significant advantages in preservation of the environment, in addition to the potential of improved appearance. However, there are significant problems to be overcome, such as susceptibility to impact damage and weathering, and dimensional instability. See, for example, U.S. Pat. Nos. 5,896,903 and 6,192,949 to the present inventor, and U.S. Pat. No. 6,098,680 Chen, each of these patents being incorporated herein by this reference.

Although some of the above difficulties are addressed in the patents referenced above, the bamboo slats as used in Venetian blinds of the prior art are still not entirely satisfactory in that they exhibit dimensional instability and weathering due to the effects of exposure to the sun and moisture, and in at least some cases they are not economical to produce.

Thus there is a need for slats of bamboo and blinds made therefrom, as well as a method for producing such slats, that overcomes the disadvantages of the prior art.

SUMMARY

The present invention meets this need by providing blinds slats that are particularly resistant to warping and other forms of deterioration when subjected to repeated exposure to the sun and moisture, the slats being formed as composites having a major proportion of bamboo and a minor proportion of wood. In one aspect of the invention, a composite blinds slat includes a bonded plurality of bamboo strips forming a center portion of the slat; and a pair of wooden strips bonded to opposite edges of the center portion, the wooden strips being flush with opposite sides of the center portion. Each of the bamboo strips and/or each of the wooden strips can form portions of opposite major faces of the blinds slat. The major faces can be planar and parallel. As used herein, the terms "wood" and "wooden" are exclusive of bamboo.

The composite blinds slat can also include a further pair of bamboo strips bonded opposite the pair of wooden strips to form respective edge portions of the blinds slat. The edge portions can be shaped to form respective rounded edge margins of the blinds slat. Also, or alternatively, each of the edge portions can include a pair of bamboo strips.

The wooden strips can include or be formed of basswood. Also, a plurality of clearance passages can be formed between opposite major faces of the blinds slat for locating the slat in a blinds assembly. Further, the invention provides a blinds assembly including a plurality of the blinds slats having the clearance openings.

In another aspect of the invention, a method for forming a composite blinds slat includes providing a plurality of bamboo strips having adhesive coatings thereon; providing a plurality of wooden strips; bonding a pair of the wooden strips together with the bamboo strips such that a majority of the bamboo strips extend in parallel adjacency between the wooden strips; and smoothing opposite surface extremities of the bamboo and wooden strips to form flush and continuous major faces of the composite blinds slat. The method can further include forming a plurality of clearance passages between the major faces of the slat. The bonding can further include bonding an additional pair of the bamboo strips opposite the pair of wooden strips to form respective edge portions of the blinds slat.

The providing can of respective pluralities of bamboo and wooden blanks, the bonding can be of the respective bamboo and wooden blanks to form a block having a majority of the bamboo blanks extending in parallel adjacence between a pair of the wooden blanks to form a block, the method further including parting the block to form a plurality of composite blanks, and the smoothing can be of opposite side of the blanks to form respective major faces of a plurality of blinds slats. Further, the bonding can be of a larger number of the respective bamboo and wooden blanks to form a composite plank, with the parting further including separating the plank into a plurality of composite blocks, thereby to form a multiplicity of the blinds slats.

DRAWINGS

These and other features, aspects, and advantages of the present invention will become better understood with reference to the following description, appended claims, and accompanying drawings, where:

DESCRIPTION

Figure 2:
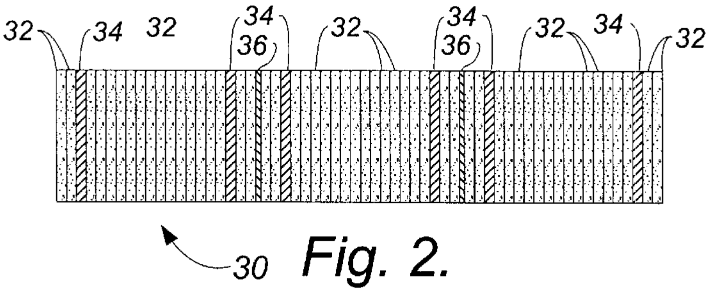
FIG. 2 is a lateral sectional view of the slat of FIG. 1.

The present invention is directed to slats for Venetian blinds, assemblies incorporating the slats, and a method for producing the slats as composites of bamboo and small amounts of wood to form a product that is particularly resistant to the deleterious effects of weathering. With reference to FIGS. 1–6 of the drawings, a blinds slat 10 according to the present invention includes a plurality of bamboo strips 12 and a parallel-spaced pair of wooden strips 14 that are located at or spaced slightly inwardly from respective opposite side edge margins 16 of the slat 10, the slat also having opposite major faces 18 and opposite ends 20, a plurality of mounting and/or alignment passages 22 extending between the faces 18. Preferably at least a center portion 24 of the slat 10 includes a plurality of the bamboo strips 12, at least one of the strips 12 extending in respective edge portions 26 between each of the wooden strips 14 and the corresponding side edge margin 16. In the exemplary configuration shown in FIGS. 1 and 2, the edge portions 26 each include two of the bamboo strips 12, the outermost being designated 12E and having a rounded contour forming the corresponding side edge margin 16. It will be understood that the center portion 24 as well as the edge portions 26 can each contain any number of the bamboo strips 12, although the center portion 24 normally contains several of the bamboo strips 12. It will be further understood that the blinds slat 10 can contain additional ones or pairs of the wooden strips 14, whether the strips of respective ones and/or pairs of the wooden strips 14 are joined or separated by one or more of the bamboo strips 12.

It has been unexpectedly discovered that only a small amount of wood material, when properly located, is effective for significantly improving the dimensional stability and resistance to weathering of the blinds slats 10 when assembled in Venetian blinds. A suitable material for the wooden srips 14 is basswood. Other suitable materials include, but are not limited to, oak, mahogany, birch, and maple.

Figure 3:
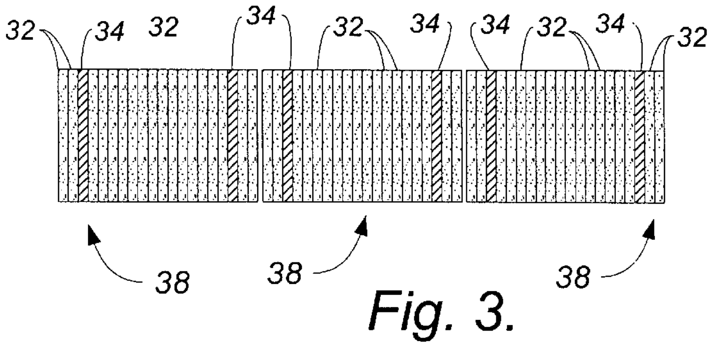
FIG. 3 is a lateral sectional view of the slat of FIG. 2 separated into composite blocks.
Figure 4:
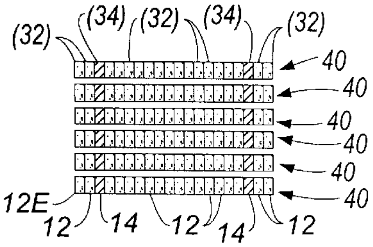
FIG. 4 is a sectional view of one of the composite blocks of FIG. 3 having been separated into a plurality of composite blanks.

FIG. 2 shows a composite plate 30 which can be prepared according to the process for forming a bamboo plate as described in the above-referenced '949 patent, except that skinless bamboo blanks 32 of the plate 32 are combined with pairs of wooden blanks 34 in a manner corresponding to a desired configuration of the blinds slats 10 to be produced therefrom. More particularly, the bamboo blanks 32 and the wooden blanks 34 are subsequently split to become respective bamboo strips 12 and wooden strips 14 of plural slats 10. The composite plate 30 can include a single complement of strips or, preferably, multiple such complements which may be separated by respective dummy slats 36 as shown in FIG. 2. FIG. 3 shows the composite plate 30 having been separated such as by cutting away the dummy strips 36 to form respective composite blocks 38. It will be understood that the dummy strips 36 can have any suitable thickness in that the severed composite blocks 38 (or the subsequently formed composite slats 10) can be trimmed to a desired width in a manner removing any remaining portions of the dummy strips 36. Alternatively, the dummy strips can be omitted, the bamboo strips 32 that will form the side edge margins 16 of the finished slats 10 being of sufficiently increased width to allow for cutting the plate 30 into the blocks 38. In another alternative, the plate 30 can be formed with adhesive material being omitted from facing sides of the bamboo strips 32 that will form the edge margins 16. FIG. 4 shows one of the composite blocks 38 having been separated into a plurality of composite blanks 40, each of the blanks 40 being subsequently finished in any suitable manner to form desired contours of the side edge margins 16 and the passages 22, and to apply suitable protective and/or decorative coatings thereto. It will be understood that the lengths of the composite plate 30 and/or the composite blocks 38 can correspond to or be greater than a desired finished length of the blinds slats 10, or multiples thereof. Further, some of the bamboo strips 32 (and even, in appropriate cases, some of the wooden strips 34) can be plural members placed end-to-end, and some such members can have lengths being than that of the blinds slats 10, in which case the slats 10 will be formed with one or more end-to-end splices in some of its strips. Moreover, such splices can be beveled, square, or having any other desired configuration.

Figure 5:
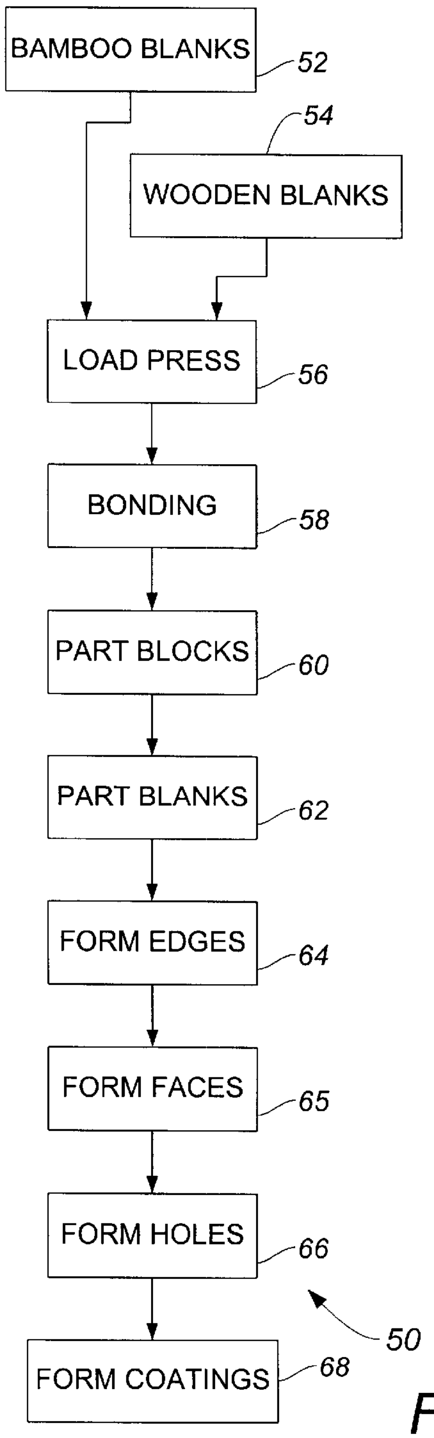
FIG. 5 is a flow chart for the process for forming the blinds slat of FIG. 1.

With particular reference to FIG. 5, a process for forming blinds slats 10, designated composite blind slat forming method 50, includes a prepare bamboo blanks step 52 wherein skinless bamboo strips are formed and treated as described up to Col. 2, line 32, of the '949 patent to provide the bamboo blanks 32. Also, a smaller number of the wooden blanks 34 are prepared in any suitable manner and coated with adhesive in a prepare wooden blanks step 54. Next, the blanks 32 and 34 are combined and loaded into a suitable press (not shown) in a load press step 56, followed by a bonding step 58 in which the composite plates 30 are formed, an exemplary configuration thereof being that shown in FIG. 2. The bonding can be performed at room temperature, and at a pressure of between approximately 45 $Kg/cm^2$ for approximately 40 minutes, using a suitable resin and hardening agent.

Each composite plate 30 is then separated into the plural composite blocks 38 (as shown in FIG. 3) in a first parting step 60, and the blocks 38 are themselves separated into the plurality of composite blanks 40 (as shown in FIG. 4) in a second parting step 62 by suitable means such as sawing.

The blanks 40 are then subjected to an edge forming step 64 wherein the contours of the side edge margins 16 are shaped by suitable means such as milling or planing, a surface forming step 65 wherein the major faces 18 are smoothed by suitable means such as sanding, planing and/or grinding, and a hole forming step 66 wherein the passages 22 are formed by suitable means such as drilling or punching. Also, suitable base and/or face coatings are applied in a finishing step 68, thereby to complete the blinds slat 10 of the present invention. It will be understood that the various forming and finishing steps are optional depending on the desired configuration of the slats 10, and they can pe performed in any suitable order. Also, the first and second parting steps are optional, although they are preferred for facilitating high production rates of the finished blinds slats 10.

Figure 1:
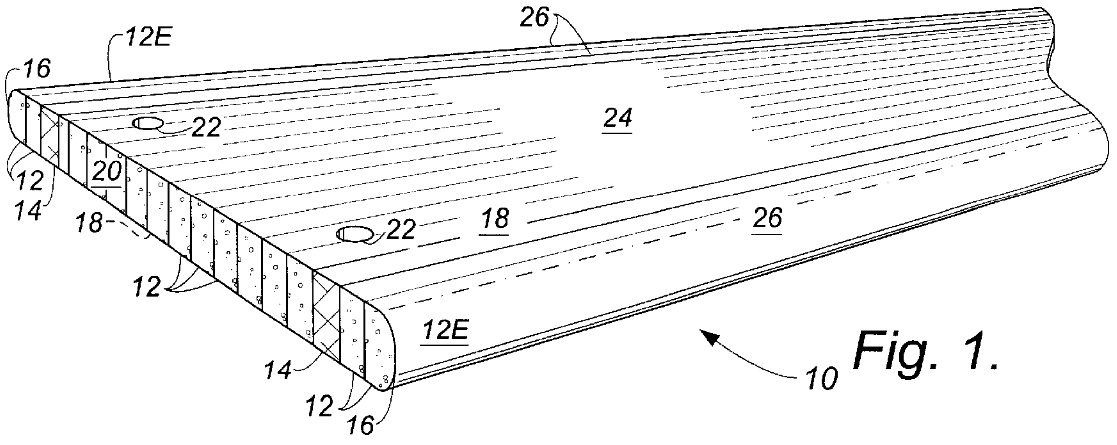
FIG. 1 is an oblique perspective view of a composite wood and bamboo blinds slat according to the present invention.
Figure 6:
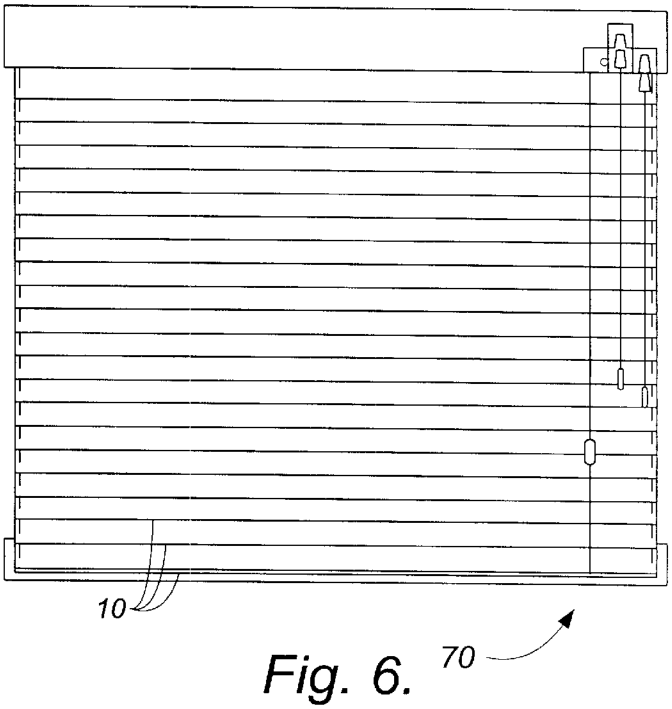
FIG. 6 is a perspective elevational view of a blinds assembly incorporating slats in the configuration of FIG. 1.

FIG. 6 shows a Venetian blinds assembly 70 incorporating composite slats 10 as shown in FIG. 1 and described above.

Although the present invention has been described in considerable detail with reference to certain preferred versions thereof, other versions are possible. For example, the slat can incorporate one or more additional wood strips. Therefore, the spirit and scope of the appended claims should not necessarily be limited to the description of the preferred versions contained herein.

What is claimed is:

1. A composite blinds slat comprising:

(a) a bonded plurality of bamboo strips forming a center portion of the slat; and (b) a pair of wooden strips bonded to opposite edges of the center portion, the wooden strips being flush with opposite sides of the center portion.

2. The composite blinds slat of claim 1, wherein each of the bamboo strips forms portions of opposite major faces of the blinds slat.

3. The composite blinds slat of claim 1, wherein each of the wooden strips forms portions of opposite major faces of the blinds slat.

4. The composite blinds slat of claim 1, wherein the major faces are planar and parallel.

5. The composite blinds slat of claim 1, further comprising a pair of bamboo strips bonded opposite the pair of wooden strips to form respective edge portions of the blinds slat.

6. The composite blinds slat of claim 5, wherein the edge portions are shaped to form respective rounded edge margins of the blinds slat.

7. The composite blinds slat of claim 5, wherein each of the edge portions comprises a pair of bamboo strips.

8. The composite blinds slat of claim 1, wherein the pair of wooden strips comprises basswood.

9. The composite blinds slat of claim 1, further comprising a plurality of clearance passages formed between opposite major faces of the blinds slat for locating the slat in a blinds assembly.

10. A blinds assembly comprising a plurality of blinds slats as claimed in claim 9.

11. A composite blinds slat comprising:

(a) a bonded plurality of bamboo strips forming a center portion of the slat;

(b) a pair of wooden strips bonded to opposite edges of the center portion, the wooden strips being flush with opposite sides of the center portion, each of the bamboo and wooden strips forming portions of opposite planar and parallel major faces of the blinds slat; and (c) a further pair of bamboo slats bonded opposite the pair of wooden strips to form respective edge portions of the blinds slat.

12. A method for forming a composite blinds slat, comprising:

(a) providing a plurality of bamboo strips having adhesive coatings thereon;

(b) providing a plurality of wooden strips;

(c) bonding a pair of the wooden strips together with the bamboo strips such that a majority of the bamboo strips extend in parallel adjacency between the wooden strips; and (d) smoothing opposite surface extremities of the bamboo and wooden strips to form flush and continuous major faces of the composite blinds slat.

13. The method of claim 12, further comprising forming a plurality of clearance passages between the major faces of the slat.

14. The method of claim 12, wherein the bonding further comprises bonding a pair of the bamboo strips opposite the pair of wooden strips to form respective edge portions of the blinds slat.

15. The method of claim 12, wherein the providing is of respective pluralities of bamboo and wooden blanks, the bonding is of the respective bamboo and wooden blanks to form a block having a majority of the bamboo blanks extending in parallel adjacence between a pair of the wooden blanks to form a block, the method further comprising parting the block to form a plurality of composite blanks, and wherein the smoothing is of opposite sides of the blanks to form respective major faces of a plurality of blinds slats.

16. The method of claim 15, wherein the bonding is of the respective bamboo and wooden blanks to form a composite plank, and the parting further comprises separating the plank into a plurality of composite blocks, thereby to form a multiplicity of the blinds slats.

* * * * *